J. J. BOWMAN.
ANGLE BAR AND NUT LOCK.
APPLICATION FILED NOV. 29, 1921.
1,423,394.
Patented July 18, 1922.
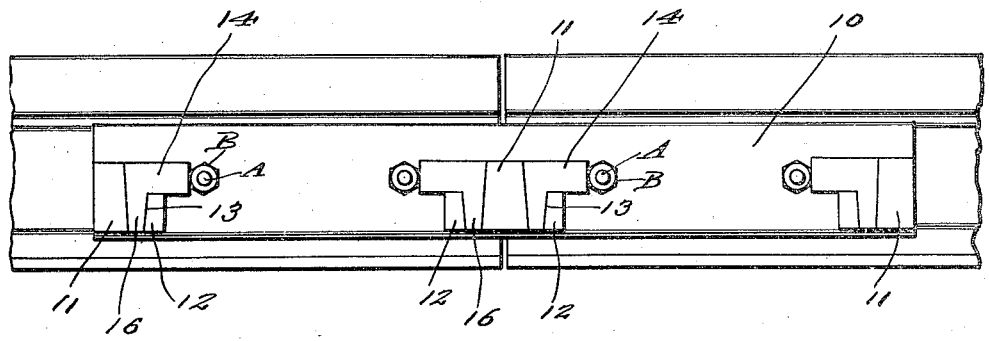
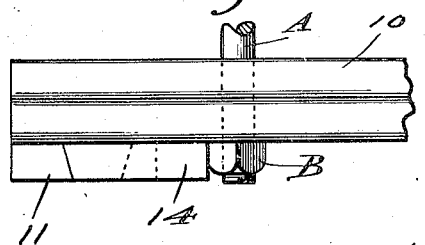
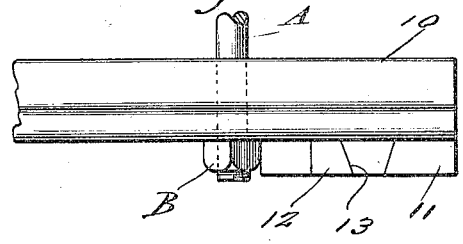
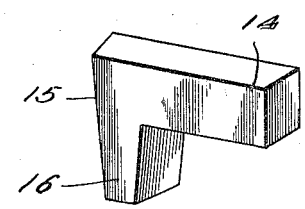
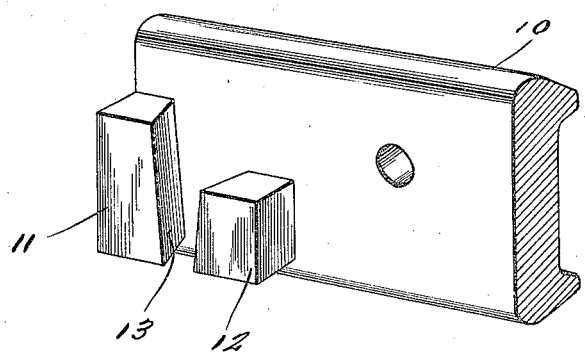
J. J. Bowman INVENTOR
BY
ATTORNEY
WITNESSES

UNITED STATES PATENT OFFICE.

JACK JAMES BOWMAN, OF PORTLAND, OREGON.

ANGLE BAR AND NUT LOCK.

1,423,394.     Specification of Letters Patent.     Patented July 18, 1922.

Application filed November 29, 1921. Serial No. 518,605.

*To all whom it may concern:*

Be it known that I, JACK J. BOWMAN, a citizen of the United States, residing at Portland, in the county of Multnomah and State of Oregon, have invented new and useful Improvements in Angle Bars and Nut Locks, of which the following is a specification.

This invention relates to angle bars used at the joints of railroal rails, and has for its object the provision of an angle bar of novel formation having means associated therewith for engagement with one of the nuts holding the bar whereby to prevent the nut from turning, the device thus operating as a nut lock.

A more specific object is the provision of an angle bar which is formed with integral lugs of peculiar formation which serve as retaining means for a slidable lock plate which constitutes a lock for the adjacent nut.

An additional object is the provision of a device of this character which will be simple and inexpensive in manufacture, easy to install, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device.

Figure 2 is a plan view of one end.

Figure 3 is a plan view of the opposite end.

Figure 4 is a perspective view of the two elements detached.

Referring more particularly to the drawings, the numeral 10 designates my angle bar through which pass bolts A carrying nuts B. Formed upon each end and upon the center of the bar 10 is a transversely extending flange 11 which has its edge toward the bolt inclined, as shown, and undercut. Formed upon the bar in spaced relation to each flange 11, is a lug 12 which has its edge toward the flange 11 undercut, as clearly shown. The undercut edge of the flange 11 and the undercut edge of the lug 12 cooperate to define a groove 13 which is dove-tailed in cross section.

The locking means comprises a plurality of plates 14 which are disposed against the bar 10 and each of which has one edge 15 inclined for conforming engagement with the undercut edge of the flange 11 and which is formed with an extension 16 which is designed to fit within the dove-tailed groove 13, the edge of this extension toward the lug 12 being inclined, as shown.

Assuming that the bolts A have been placed in position and that the nuts B have been applied thereto and screwed home, the plates 14 are placed in position with the extensions 16 fitting between the flanges 11 and lugs 12 with the smaller edges of the plates engaging against one flat face of the nuts B, as shown in Figure 1. It will be apparent that the plates 14 will then effectively operate as a lock for preventing rotation of the nuts.

From the foregoing description and a study of the drawings it will be apparent that I have thus provided a simply constructed and consequently inexpensive angle bar provided with means whereby a securing nut may be effectively locked and consequently held against displacement.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. An angle bar formed at one end with an inclined flange and formed with a lug arranged in spaced relation to the flange, and a plate disposed against the bar and having an extension fitting between the flange and the lug, one end of the plate being engageable against a nut carried by a bolt passing through the bar.

2. An angle bar of the character described comprising a bar formed at one end with a flange having its inner edge inclined and undercut, the bar being formed with a lug arranged in spaced relation to the flange and having its edge toward the latter undercut, a bolt passing through the bar and carrying a clamping nut, in combination with a plate disposed against the bar with one end engaging against a flat side of the nut, said plate being formed with an extension dovetailed in cross section for conforming engagement with the undercut edges of the flange and the lug.

3. An angle bar formed at each end and at its center with an inclined flange and also formed with a lug arranged in spaced relation to each flange, a plate disposed against the bar and having an extension fitting between each of the associated flanges and lugs, bolts passing through the bar, nuts upon the bar, and one end of each plate being engageable against a flat face of the nut adjacent thereto.

In testimony whereof I affix my signature.

JACK JAMES BOWMAN.